(12) United States Patent
Honda

(10) Patent No.: US 9,274,206 B2
(45) Date of Patent: Mar. 1, 2016

(54) WIRELESS DEVICE, CONTROL METHOD, RECORDING MEDIUM, AND DISPLAY METHOD

(71) Applicant: FUJITSU LIMITED, Kawasaki-shi, Kanagawa (JP)

(72) Inventor: Atsushi Honda, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 14/040,046

(22) Filed: Sep. 27, 2013

(65) Prior Publication Data

US 2014/0134955 A1 May 15, 2014

(30) Foreign Application Priority Data

Nov. 14, 2012 (JP) .................... 2012-249948

(51) Int. Cl.
*H04B 17/27* (2015.01)
*H04B 17/30* (2015.01)
*G01S 3/50* (2006.01)
*G01S 5/02* (2010.01)

(52) U.S. Cl.
CPC .......................... *G01S 5/02* (2013.01)

(58) Field of Classification Search
CPC .............. G01S 5/02; G01S 3/50; G01S 3/02; H04B 7/086; H04B 17/27; H04B 17/30; H04W 24/08
See application file for complete search history.

(56) References Cited

U.S. PATENT DOCUMENTS

| | | | | |
|---|---|---|---|---|
| 5,945,948 A * | 8/1999 | Buford | ................... | G01S 5/021 342/457 |
| 6,073,032 A * | 6/2000 | Keskitalo | ............... | H04B 7/086 455/277.1 |
| 9,035,827 B2 * | 5/2015 | Marshall | ................... | G01S 5/00 342/357.31 |
| 2003/0114169 A1 * | 6/2003 | Okamura | ................. | G01S 3/48 455/456.1 |
| 2006/0224309 A1 * | 10/2006 | Schmidt | ................. | G05D 1/028 701/509 |
| 2007/0063897 A1 * | 3/2007 | Matsuda | ....................... | 342/463 |
| 2011/0280330 A1 * | 11/2011 | Tanaka | ................... | H04B 7/024 375/267 |
| 2011/0285590 A1 * | 11/2011 | Wellington | .................... | 342/417 |

FOREIGN PATENT DOCUMENTS

| | | |
|---|---|---|
| JP | 2001-36320 | 2/2001 |
| JP | 2008-252709 | 10/2008 |

* cited by examiner

*Primary Examiner* — Andrew Wendell
(74) *Attorney, Agent, or Firm* — Fujitsu Patent Center

(57) ABSTRACT

A wireless device includes a receiver that receives a first radio signal transmitted from a first communication device and a second radio signal transmitted from a second communication device, and a processor that detects a first arrival direction which is a direction opposite to a propagation direction of the received first radio signal and a second arrival direction which is a direction opposite to a propagation direction of the received second radio signal and generates a first signal for guiding the wireless device so as to be located on a straight line that extends in a propagation direction of the second radio signal received by the first communication device based on the detected first and second arrival directions.

14 Claims, 13 Drawing Sheets

WIRELESS DEVICE, CONTROL METHOD, RECORDING MEDIUM, AND DISPLAY METHOD

CROSS-REFERENCE TO RELATED APPLICATION

This application is based upon and claims the benefit of priority of the prior Japanese Patent application No. 2012-249948, filed on Nov. 14, 2012, the entire contents of which are incorporated herein by reference.

FIELD

The embodiments discussed herein are directed to a wireless device, a control method, a control program, and a display method.

BACKGROUND

A wireless device that receives a radio signal transmitted by a communication device and outputs information for guiding the wireless device based on the received radio signal is known. As an example of this type of wireless device, a mobile communication terminal disclosed in Patent Literature 1 (Japanese Laid-open Patent Publication No. 2001-36320) measures signal strength in each direction using a directional antenna. The mobile communication terminal outputs information for guiding the wireless device to such a position that a stronger radio signal is received from a base station based on the measured signal strength.

Note that Patent Literature 2 (Japanese Laid-open Patent Publication No. 2008-252709) discloses a technique of using a spatial correlation value. Specifically, the base station disclosed in Patent Literature 2 calculates a spatial correlation value based on radio signals transmitted from a plurality of terminal devices, determines whether the calculated spatial correlation value is equal to or larger than a threshold value, and determines whether the base station can execute radio communication with the plurality of terminal devices according to a space division multiple access (SDMA) scheme based on the determination result.

However, a radio communication system (for example, a mobile communication system, a radio sensor network, and the like) that includes a plurality of communication devices that perform radio communication with each other is known. In this type of radio communication system, an abnormality may be detected in the radio communication between first and second communication devices.

In this case, it is ideal that a wireless device is disposed at such a position that the wireless device can receive a radio signal having sufficiently strong correlation with a radio signal that is transmitted by the second communication device and is received by the first communication device, and the wireless device examines the quality of the radio signal. Thus, the technique disclosed in Patent Literature 1 can be applied. According to this technique, it is possible to guide the wireless device to be located sufficiently near the first communication device.

However, as illustrated in FIG. 1, the radio signal transmitted by a second communication device R2 may be blocked by obstacles and/or the geography. In this case, even when a wireless device S1 is located sufficiently near a first communication device R1, there is a problem in that it is difficult for the wireless device S1 to receive a radio signal having sufficiently strong correlation with the radio signal that is transmitted by the second communication device R2 and is received by the first communication device R1.

SUMMARY

According to an aspect of the embodiments, there is provided a wireless device including: a receiver that receives a first radio signal transmitted from a first communication device and a second radio signal transmitted from a second communication device; and a processor that detects a first arrival direction which is a direction opposite to a propagation direction of the received first radio signal and a second arrival direction which is a direction opposite to a propagation direction of the received second radio signal and generates a first signal for guiding the wireless device so as to be located on a straight line that extends in a propagation direction of the second radio signal received by the first communication device based on the detected first and second arrival directions.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In order to solve at least one of the above problems, respective embodiments of a wireless device, a control method, a control program, and a display method according to the present invention will be described with reference to FIGS. 2 to 13.

First Embodiment

Overview

A wireless device according to a first embodiment is applied to a radio communication system that includes a plurality of communication devices that form a wireless ad-hoc network and perform multi-hop communication. The wireless device is used to examine whether a first communication device properly receives a radio signal from a second communication device. Hereinafter, the wireless device is sometimes referred to as an examination terminal.

The wireless device receives a first radio signal transmitted by the first communication device and a second radio signal transmitted by the second communication device. Further, the wireless device detects a first arrival direction which is a direction opposite to a propagation direction of the received first radio signal and a second arrival direction which is a direction opposite to a propagation direction of the received second radio signal.

Further, the wireless device generates a first guide signal for guiding the wireless device so as to be located on a straight line that extends in a propagation direction of the second radio signal received by the first communication device based on the detected first and second arrival directions.

The wireless device outputs information based on the first guide signal. According to this configuration, the user holding the wireless device moves so as to be located on the straight line according to the output information. As a result, the wireless device is guided so as to be located on the straight line.

After that, the wireless device generates a second guide signal for making the wireless device to approach the first communication device. The wireless device outputs information based on the second guide signal. According to this configuration, the user holding the wireless device approaches the first communication device according to the output information. As a result, the wireless device can be guided to such a position that the wireless device can receive the second radio signal having sufficiently strong correlation with the second radio signal received by the first communication device.

Hereinafter, the first embodiment will be described in detail.
(Configuration)

Figure 1:
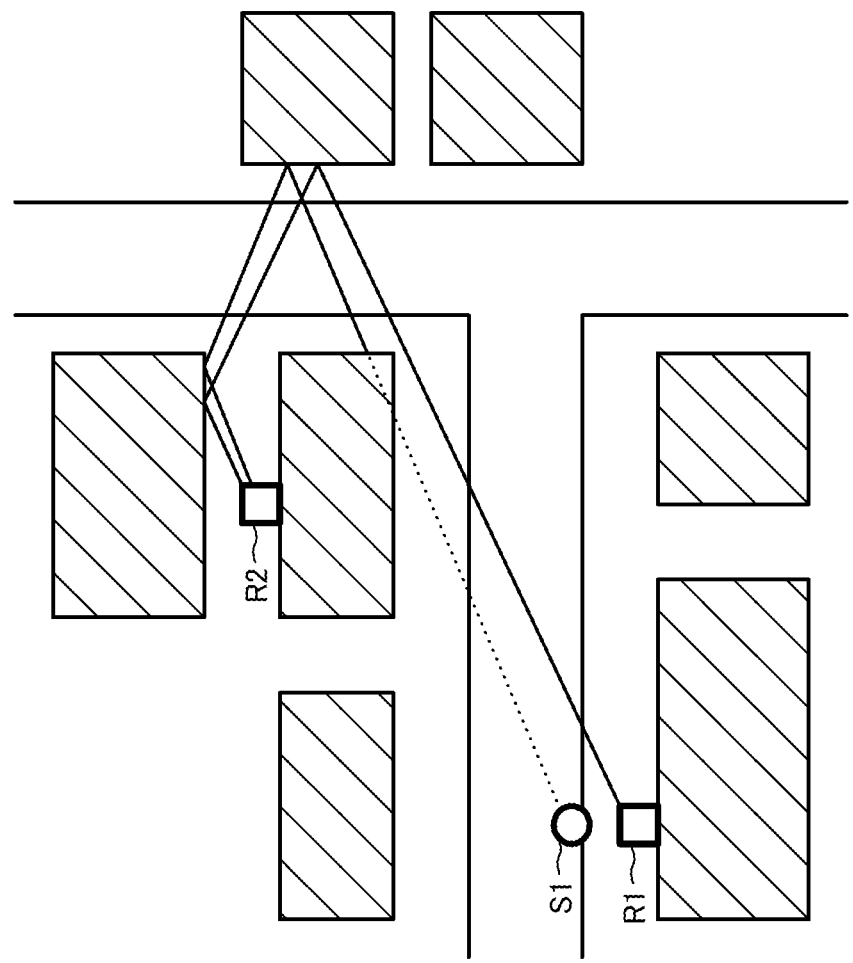
FIG. 1 is an explanatory diagram illustrating an example of a case where it is difficult for a wireless device to receive a radio signal having sufficiently strong correlation with a radio signal that is received by a first communication device in a related art.
Figure 2:
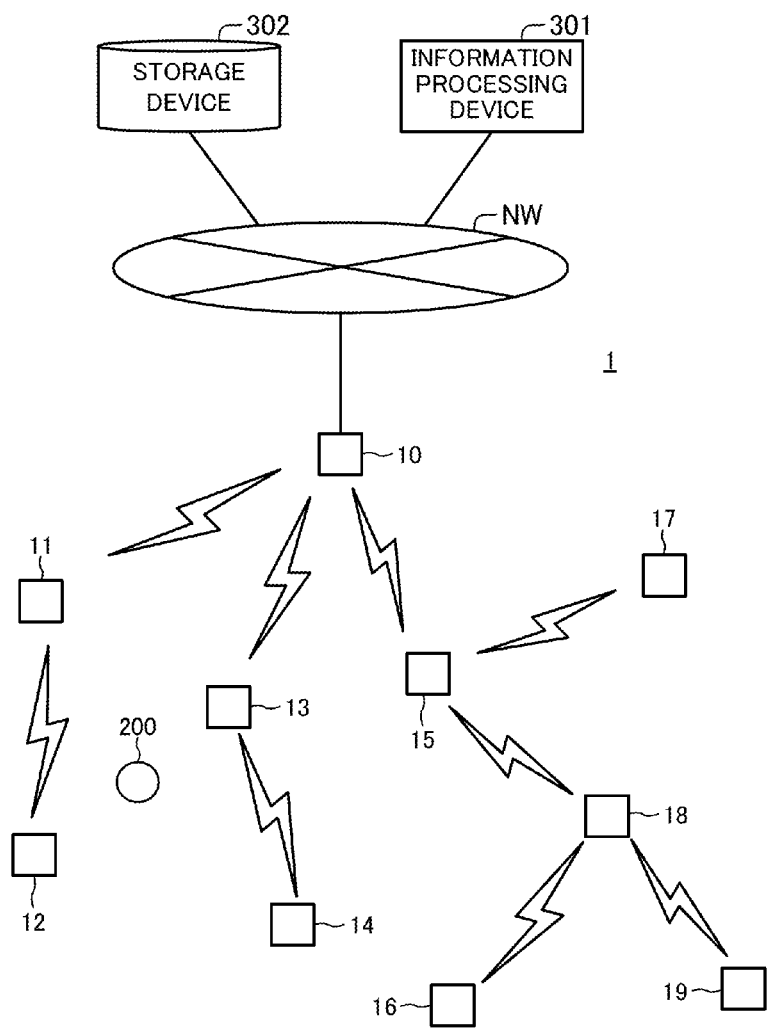
FIG. 2 is a diagram illustrating a configuration of a radio communication system as an example of a first embodiment.

As illustrated in FIG. 2, a radio communication system 1 according to the first embodiment includes a plurality of (in this example, ten) communication devices (wireless nodes) 10, 11, ..., and 19. Note that the radio communication system 1 may include an optional number of (two or more) communication devices.

The radio communication system 1 forms a wireless ad-hoc network. In this example, the radio communication system 1 is configured to perform multi-hop communication. Note that the radio communication system 1 may be configured to perform single-hop communication only. Further, in this example, the radio communication system 1 forms wireless sensor networks (WSN).

The communication device 10 is communicably connected to an information processing device 301 and a storage device 302 via a communication network NW. Note that at least one communication device other than the communication device 10 among the plurality of communication devices 10, 11, ..., and 19 included in the radio communication system 1 may also be communicably connected to the information processing device 301 and the storage device 302.

Each of the plurality of communication devices 10, 11, ..., and 19 is configured to execute radio communication with other communication devices 10, 11, ..., and 19 located within a range where the communication devices can transmit and receive radio signals (for example, in such a range that the strength (received signal strength) of the received radio signal is equal to or larger than a certain reference value).

Figure 3:
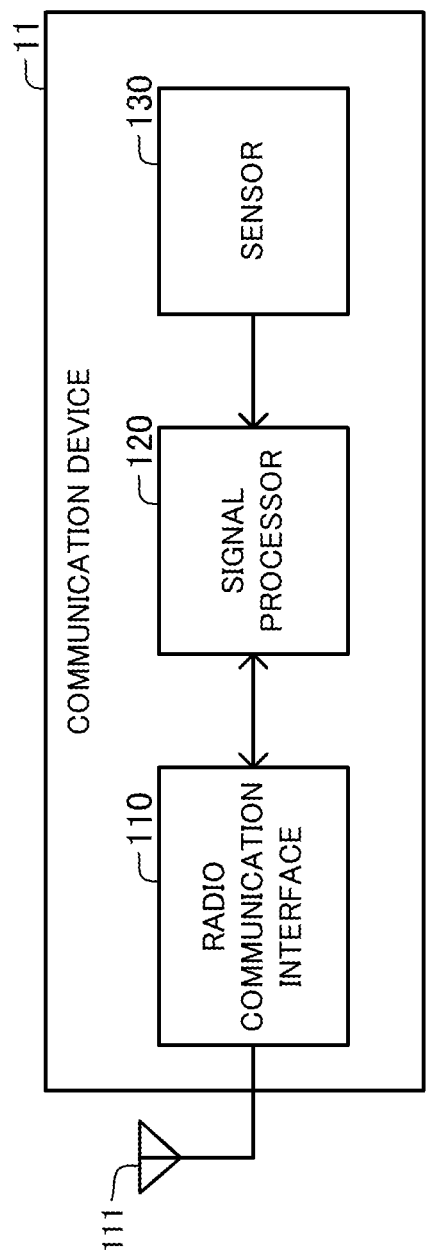
FIG. 3 is a diagram illustrating a configuration of a communication device as an example of the first embodiment.

As illustrated in FIG. 3, the communication device 11 includes a radio communication interface 110, a signal processor 120, and a sensor 130. Note that the communication devices 10, 12, ..., and 19 other than the communication device 11 have the same configuration as the communication device 11.

The sensor 130 measures physical quantities (for example, temperature, humidity, illuminance, wind direction, wind speed, seismic motion, precipitation, sound level, water level, power consumption amount, water consumption amount, gas consumption amount, and the like) and outputs physical quantity information representing the measured physical quantities to the signal processor 120. In this example, the sensor 130 measures the physical quantities every certain measurement cycle. Note that the sensor 130 may be configured to measure physical quantities whenever the communication device 11 receives a certain measurement request.

The signal processor 120 modulates a signal representing information that includes the physical quantity information output by the sensor 130 and a device identifier for identifying (specifying) the device (in this example, the communication device 11) of the radio communication system 1 and outputs the modulated signal to the radio communication interface 110.

Further, the signal processor 120 demodulates a radio signal output by the radio communication interface 110 and executes a process based on the demodulated signal. For example, the signal processor 120 executes a path determination process and a transmission process as the process.

The path determination process is a process for determining a path for transmitting the physical quantity information from the respective communication devices 11, ..., and 19 to the communication device 10. For example, the signal processor 120 acquires a device identifier for identifying a communication device which is a transmitter of the received radio signal and the strength (received signal strength) of the received radio signal and exchanges the acquired device identifier and received signal strength with other communication devices. The signal processor 120 determines the path based on the device identifier and received signal strength acquired in the wireless device and the device identifiers and received signal strength acquired in the other communication devices 11, ..., and 19.

Note that the path determination process may be executed by a device (for example, the communication device 10 or a device other than the communication devices 10, 11, ..., and 19) that manages the radio communication system 1. In this case, the determined path is notified to the respective communication devices 10, 11, ..., and 19.

The transmission process is a process of transmitting the physical quantity information received from one communication device other than the wireless device to another communication device other than the wireless device, specified according to the path determined in the path determination process.

The radio communication interface 110 includes an antenna 111. The radio communication interface 110 receives a radio signal through the antenna 111. The radio communication interface 110 outputs the received radio signal to the signal processor 120. The radio communication interface 110 transmits a signal as the radio signal output from the signal processor 120 through the antenna 111.

The communication device 10 includes a cable communication interface (not illustrated) in addition to the configuration of the communication device 11. The cable communication interface is connected to the communication network NW through a communication cable. Note that the communication device 10 may be connected to the communication network NW by radio communication without including the cable communication interface.

The communication device 10 receives the physical quantity information transmitted by the respective communication devices 11, . . . , and 19 and transmits the received physical quantity information to the storage device 302 via the communication network NW. The storage device 302 stores (accumulates) the received physical quantity information.

The information processing device 301 executes a process based on the physical quantity information stored in the storage device 302. For example, the information processing device 301 aggregates the physical quantities represented by the physical quantity information and outputs the aggregated physical quantities with the aid of an output device.

As illustrated in FIG. 2, the wireless device 200 is applied to the radio communication system 1. In this example, the wireless device 200 is used as an examination terminal for examining whether each of the communication devices 10, 11, . . . , and 19 properly receives radio signals from other communication devices 10, 11, . . . , and 19. Note that the wireless device 200 may have the function of the communication device 11.

Figure 4:
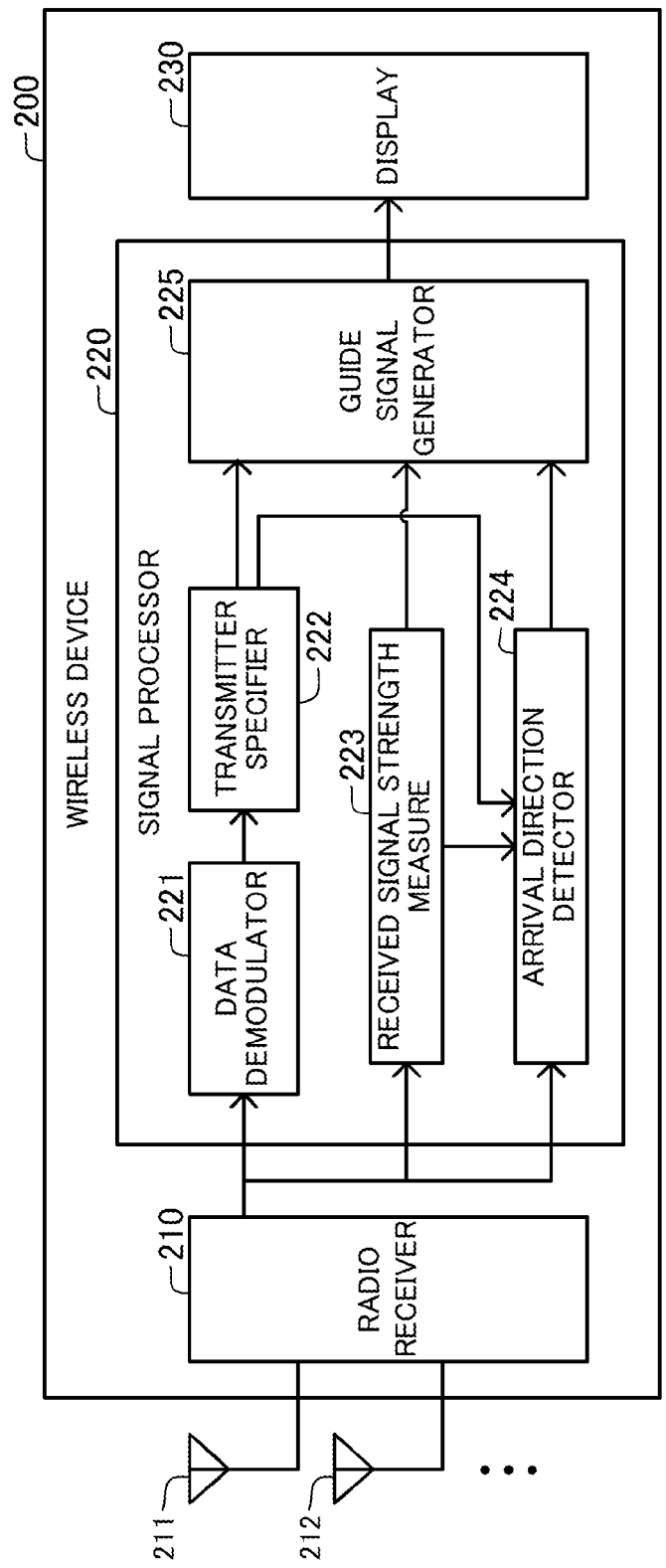
FIG. 4 is a diagram illustrating a configuration of a wireless device as an example of the first embodiment.

In this example, the wireless device 200 is configured to be carried by the user. Note that the wireless device 200 may be configured to be mounted on a movable device (for example, a vehicle or the like). As illustrated in FIG. 4, the wireless device 200 includes a radio receiver (receiver) 210, a signal processor (processor) 220, and a display 230.

The radio receiver 210 includes a plurality of antennas 211, 212, . . . , and so on. The radio receiver 210 receives radio signals through the plurality of antennas 211, 212, . . . , and so on. The radio receiver 210 outputs the received radio signal to the signal processor 220.

In this example, each of the plurality of antennas 211, 212, . . . , and so on is a directional antenna. Further, the plurality of antennas 211, 212, . . . , and so on are configured such that the respective strong gain directions are different from each other. The strong gain direction is a direction in which the received signal strength (that is, the gain to the received radio signal) is relatively larger than the other directions.

Note that the radio receiver 210 includes at least one directional antenna, and is configured such that the directional antenna can change the strong gain direction. Moreover, the directional antenna may be an array antenna in which a plurality of antennas is arranged on a plane.

The signal processor 220 includes a data demodulator 221, a transmitter specifier 222, a received signal strength measure 223, an arrival direction detector 224, and a guide signal generator 225.

The data demodulator 221 demodulates a radio signal output by the radio receiver 210 with respect to each of the plurality of antennas 211, 212, . . . , and so on and outputs the demodulated signal to the transmitter specifier 222.

The transmitter specifier 222 specifies a communication device which is a transmitter of the source radio signal of the signal output by the data demodulator 221 with respect to each of the plurality of antennas 211, 212, . . . , and so on based on the output signal. In this example, the transmitter specifier 222 specifies a communication device identified by a device identifier that is included in the information represented by the signal as a transmitter of the radio signal. The transmitter specifier 222 notifies the specified transmitter of the radio signal to the arrival direction detector 224 and the guide signal generator 225.

The received signal strength measure 223 measures the strength (received signal strength) of the radio signal received by the radio receiver 210 with respect to each of the plurality of antennas 211, 212, . . . , and so on. The received signal strength measure 223 notifies the measured received signal strength to the arrival direction detector 224 and the guide signal generator 225.

Note that in each of the data demodulator 221, the transmitter specifier 222, and the received signal strength measure 223, a circuit that performs processing on one antenna may be included for each antenna.

The arrival direction detector 224 stores a first device identifier and a second device identifier. The first device identifier is a device identifier for identifying the first communication device. The second device identifier is a device identifier for identifying the second communication device.

In this example, the first and second communication devices are two different communication devices among the communication devices 10, 11, . . . , and 19 included in the radio communication system 1. The first communication device is a communication device that receives a radio signal that is subjected to examination. The second communication device is a communication device that transmits the radio signal that is subjected to examination.

In this example, the first and second device identifiers are set based on information that is input by the user of the wireless device 200. Note that the first and second device identifiers may be stored in advance.

The arrival direction detector 224 detects first and second arrival directions based on the transmitter of the radio signal notified by the transmitter specifier 222 and the received signal strength notified by the received signal strength measure 223.

The first arrival direction is opposite to the propagation direction of the radio signal that is transmitted by the first communication device and is received by the radio receiver 210. The second arrival direction is opposite to the propagation direction of the radio signal that is transmitted by the second communication device and is received by the radio receiver 210.

In this example, the arrival direction detector 224 detects a strong gain direction of an antenna that has received a radio signal having the largest received signal strength among the radio signals of which the transmitter is the same as a communication device (the first communication device) identified by the stored first device identifier as the first arrival direction. Similarly, the arrival direction detector 224 detects a strong gain direction of an antenna that has received a radio signal having the largest received signal strength among the radio signals of which the transmitter is the same as a communication device (the second communication device) identified by the stored second device identifier as the second arrival direction.

Note that the arrival direction detector 224 may be configured to detect the first and second arrival directions based on the received signal strength of each of the radio signals received by the plurality of antennas and the strong gain direction of each of the plurality of antennas.

The guide signal generator 225 generates a first guide signal (first signal) based on the first and second arrival directions detected by the arrival direction detector 224. The first guide signal is a signal for guiding the wireless device 200 so as to be located on a straight line that extends in a propagation direction of a radio signal that is transmitted by the second communication device and is received by the first communication device.

For example, the guide signal generator 225 generates the first guide signal indicating that an arrival direction angle is within a certain reference range. The arrival direction angle is an angle formed by the first and second arrival directions. The reference range is a certain range including 180°. For example, the reference range is a range from 175° to 185°, a range from 170° to 190°, a range from 165° to 195°, or the like.

Further, the guide signal generator 225 generates the first guide signal indicating the first guiding direction when the arrival direction angle is outside the reference range. The first guiding direction is a direction that is between the first and second arrival directions and that is in a side where the angle formed by the first and second arrival directions is smaller than 180°. In this example, the first guiding direction is an intermediate direction between the first and second arrival directions.

Note that the guide signal generator 225 may generate a first guide signal indicating that the arrival direction angle is 180° and generate a first guide signal indicating the first guiding direction when the arrival direction angle is not 180°. According to this configuration, the wireless device 200 can recognize that the wireless device 200 is located on a straight line that extends in a propagation direction of a radio signal that is transmitted by the second communication device and is received by the first communication device.

In addition, the guide signal generator 225 calculates a correlation parameter when the arrival direction angle is within the reference range. The correlation parameter is a parameter that represents the strength of correlation between the radio signal that is transmitted by the second communication device and is received by the first communication device and the radio signal that is transmitted by the second communication device and is received by the wireless device 200.

In this example, the wireless device 200 calculates a correlation parameter $\rho(\Delta x)$ based on Mathematical Formula 1 below when the distance between the wireless device 200 and the first communication device is $\Delta x$. Here, $\Omega(\theta)$ represents the magnitude of the power of a radio signal received at an arrival angle $\theta$. The arrival angle $\theta$ is an angle formed by a propagation direction of a radio signal that is transmitted by the second communication device and is received by the wireless device 200 and a certain reference direction. j is an imaginary number. $\lambda$ is a wavelength of the radio signal.

$$\rho(\Delta x) = \frac{\int_0^{2\pi} \Omega(\theta) \exp\left(j \frac{2\pi \Delta x}{\lambda} \cos\theta\right) d\theta}{\int_0^{2\pi} \Omega(\theta) d\theta} \quad \text{[Mathematical Formula 1]}$$

In this example, the distance $\Delta x$ between the wireless device 200 and the first communication device is estimated based on the received signal strength of the radio signal that is transmitted by the first communication device. Note that the distance $\Delta x$ may be a value that is input by the user of the wireless device 200.

Note that Mathematical Formula 1 above may be derived based on the content described in Non Patent Document 1 (Karasawa Yoshio, "Basics of radio propagation in digital mobile communication," Corona Ltd, February, 2003, pages 65-67).

The guide signal generator 225 generates a second guide signal (second signal) indicating that the correlation parameter calculated when the arrival direction angle is within the reference range is equal to or larger than a certain threshold value (for example, 0.8, 0.85, 0.9, or 0.95).

On the other hand, the guide signal generator 225 generates a second guide signal for making the wireless device 200 to approach the first communication device when the correlation parameter calculated when the arrival direction angle is within the reference range is smaller than the threshold value. In this example, the second guide signal is a signal that represents the first arrival direction.

Further, the signal processor 220 executes a measuring process when the correlation parameter calculated when the arrival direction angle is within the reference range is equal to or larger than the threshold value. The measuring process is a process of measuring measurement parameters. Examples of the measurement parameters include the received signal strength of a radio signal that is transmitted by the second communication device and is received by the wireless device 200, an error rate of the radio signal, and a signal-to-noise ratio (SNR) of the radio signal.

The display 230 displays information represented by the first and second guide signals output by the guide signal generator 225 on a display. That is, the display 230 can be said to display information for guiding the wireless device 200 so as to be located on the straight line that extends in a propagation direction of the radio signal that is transmitted by the second communication device and is received by the first communication device based on the first and second arrival directions. Note that the wireless device 200 may be configured to output information representing the first and second guide signals in the form of sound.

(Operation)

Next, the operation of the wireless device 200 will be described. The operation will be described with reference to FIGS. 5 to 10.

Figure 5:
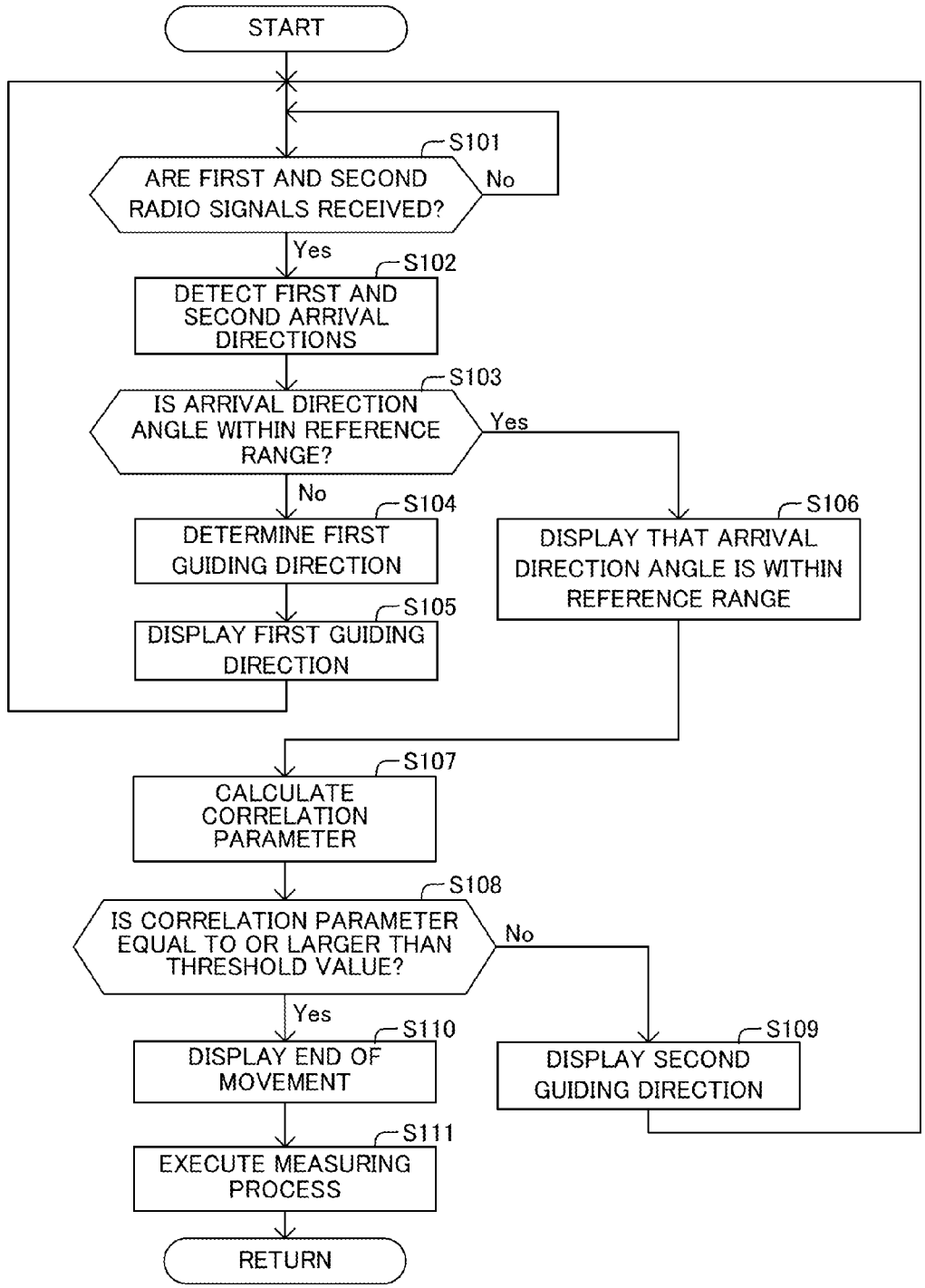
FIG. 5 is a flowchart illustrating a guiding process executed by the wireless device as an example of the first embodiment.

The wireless device 200 executes a guiding process illustrated by the flowchart of FIG. 5. For example, the wireless device 200 starts executing the guiding process according to an instruction input by the user of the wireless device 200.

Figure 6:
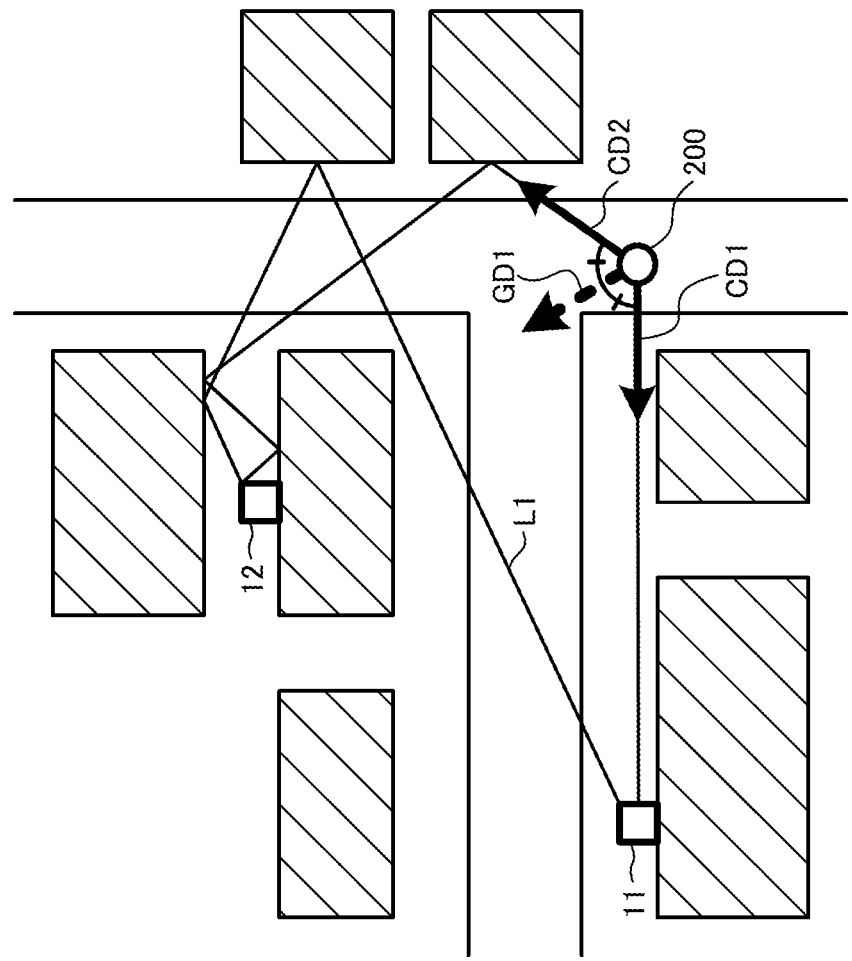
FIG. 6 is an explanatory diagram illustrating a first guiding direction for the wireless device as an example of the first embodiment.

In this example, as illustrated in FIG. 6, it is assumed that a communication device 11, a communication device 12, and the wireless device 200 are disposed, and that the wireless device 200 stores a device identifier for identifying the communication device 11 as a first device identifier and a device identifier for identifying the communication device 12 as a second device identifier in advance. That is, the communication device 11 is also referred to as a first communication device, and the communication device 12 is also referred to as a second communication device.

First, the wireless device 200 waits until first and second radio signals are received (step S101 of FIG. 5). Here, the first radio signal is a radio signal that is transmitted by the first communication device. The second radio signal is a radio signal that is transmitted by the second communication device.

For example, the wireless device 200 determines that the first radio signal is received when a radio signal including information that represents the same device identifier as the first device identifier stored in advance is received. Similarly, the wireless device 200 determines that the second radio signal is received when a radio signal including information that represents the same device identifier as the second device identifier stored in advance is received.

The wireless device 200 determines as "Yes" when the first and second radio signals are received, and detects first and second arrival directions CD1 and CD2 (step S102 of FIG. 5 and FIG. 6).

Subsequently, the wireless device 200 determines whether the arrival direction angle is within the reference range (step S103 of FIG. 5). Note that, in this example, it is assumed that the reference range is in the range from 178° to 182°. At this time, as illustrated in FIG. 6, it is assumed that the arrival direction angle is not within the reference range.

Figure 7:
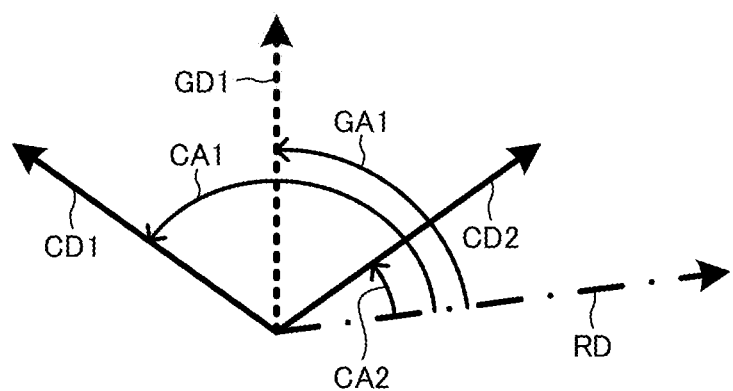
FIG. 7 is an explanatory diagram illustrating relation between the first guiding direction determined by the wireless device as an example of the first embodiment and first and second arrival directions.

Thus, in this case, the wireless device 200 determines as "No," and determines the first guiding direction GD1 (step S104 of FIG. 5). For example, the wireless device 200 calculates a first guide angle GA1 based on Mathematical Formula 2 below. Here, as illustrated in FIG. 7, RD is a certain reference direction. CA1 is a rotation angle in a certain reference rotation direction (in this example, a counterclockwise direction) from the reference direction RD to the first arrival direction CD1. CA2 is a rotation angle in the reference rotation direction from the reference direction RD to the second arrival direction CD2. The guide angle GA1 is a rotation angle in the reference rotation direction from the reference direction RD to the first guiding direction GD1.

$$GA1 = \frac{CA1 + CA2}{2} \quad \text{[Mathematical Formula 2]}$$

Figure 8:
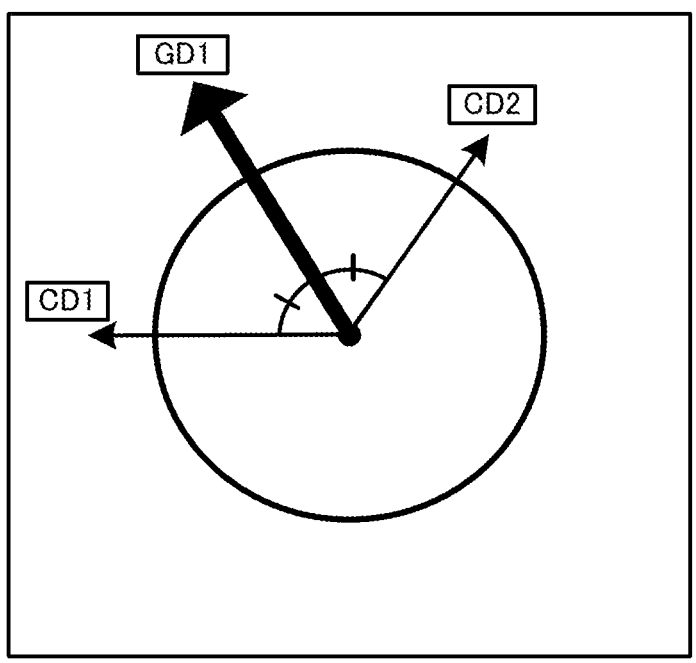
FIG. 8 is an explanatory diagram illustrating the first guiding direction displayed by the wireless device as an example of the first embodiment.

Further, the wireless device 200 determines a direction in the reference rotation direction by the calculated first guide angle GA1 from the reference direction as the first guiding direction GD1. Subsequently, the wireless device 200 generates the first guide signal indicating the determined first guiding direction GD1 and displays the first guiding direction GD1 on a display as illustrated in FIG. 8 based on the generated first guide signal (step S105 of FIG. 5).

According to this configuration, the user holding the wireless device 200 moves along the displayed first guiding direction GD1. As a result, the wireless device 200 approaches the straight line L1 that extends in a propagation direction of the radio signal that is transmitted by the second communication device 12 and is received by the first communication device 11 (FIG. 6).

After that, the wireless device 200 returns to step S101 of FIG. 5 and executes the processes of steps S101 to S105 repeatedly until it is determined in step S103 that the arrival direction angle is within the reference range.

When the wireless device 200 approaches the straight line L1 and as a result, the wireless device 200 is located on the straight line L1 (FIG. 9), the wireless device 200 determines in step S103 that the arrival direction angle is within the reference range (that is, "Yes").

Subsequently, the wireless device 200 generates a first guide signal indicating that the arrival direction angle is within the reference range. Moreover, the wireless device 200 displays information (for example, a message) indicating that the arrival direction angle is within the reference range based on the generated first guide signal (step S106 of FIG. 5).

Subsequently, the wireless device 200 calculates a correlation parameter (step S107 of FIG. 5). The wireless device 200 determines whether the calculated correlation parameter is equal to or larger than the threshold value (step S108 of FIG. 5). At this time, it is assumed that the correlation parameter is smaller than the threshold value.

In this case, the wireless device 200 determines as "No", generates a second guide signal indicating the first arrival direction CD1 as a second guiding direction GD2, and displays the second guiding direction GD2 based on the generated second guide signal (step S109 of FIG. 5).

Figure 9:
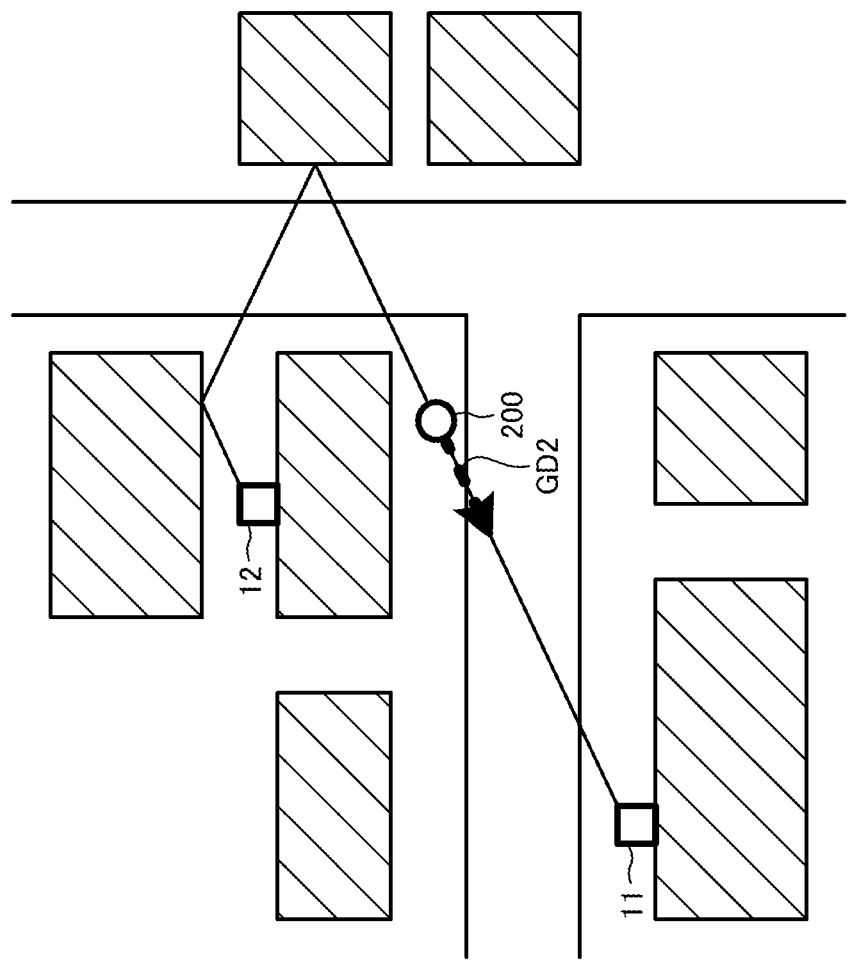
FIG. 9 is an explanatory diagram illustrating a second guiding direction for the wireless device as an example of the first embodiment.
Figure 10:
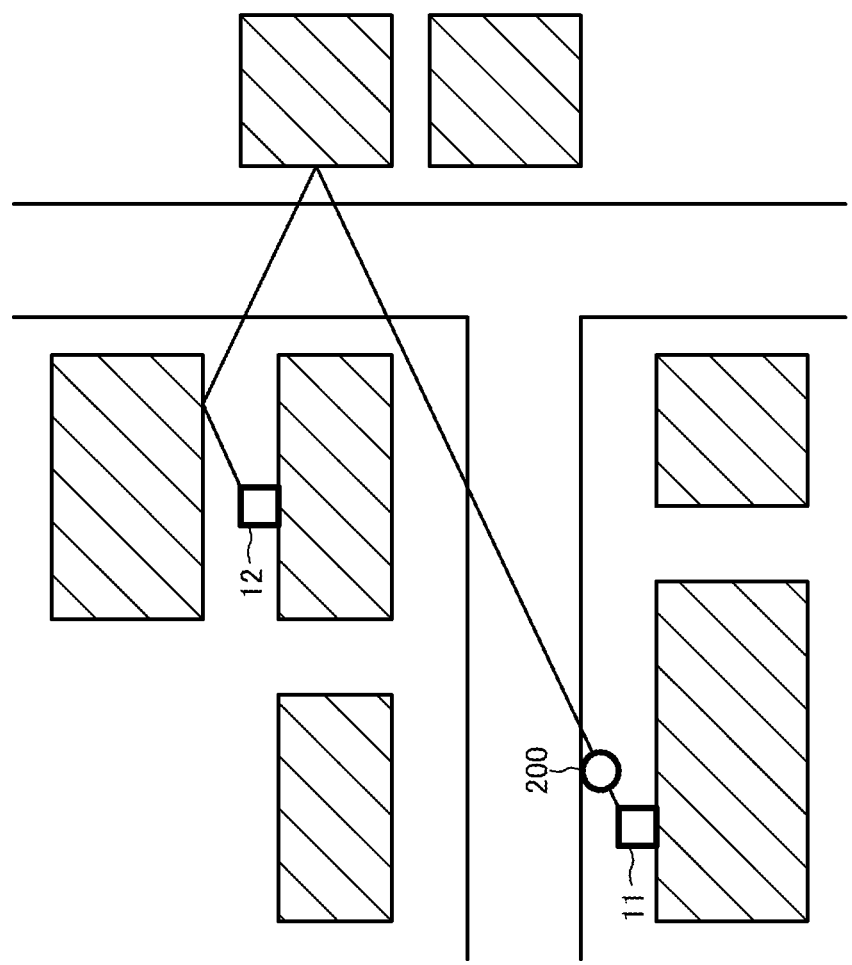
FIG. 10 is an explanatory diagram illustrating a state where the wireless device as an example of the first embodiment arrives at a position where a measurement process is to be executed.

According to this configuration, the user holding the wireless device 200 moves along the displayed second guiding direction GD2. As a result, the wireless device 200 approaches the first communication device 11 on the straight line L1 (FIG. 9).

After that, the wireless device 200 returns to step S101 of FIG. 5 and executes the processes of steps S101 to S109 repeatedly until it is determined in step S108 that the correlation parameter is equal to or larger than the threshold value.

When the wireless device 200 approaches the communication device 11, and as a result, the distance between the wireless device 200 and the communication device 11 is sufficiently short (FIG. 10), the wireless device 200 determines in step S108 that the correlation parameter is equal to or larger than the threshold value (that is, "Yes").

Subsequently, the wireless device 200 generates a second guide signal indicating the end of movement and displays information (for example, a message) indicating the end of movement based on the generated second guide signal (step S110 of FIG. 5). Note that, in this example, the signal indicating the end of movement is an example of a signal indicating that the correlation parameter is equal to or larger than the threshold value.

Moreover, the wireless device 200 executes a measuring process (step S111 of FIG. 5). After that, the wireless device 200 ends the guiding process illustrated in FIG. 5.

As described above, the wireless device 200 according to the first embodiment detects the first and second arrival directions CD1 and CD2 and generates the first guide signal for guiding the wireless device 200 so as to be located on the straight line L1 that extends in a propagation direction of the radio signal that is transmitted by the second communication device 12 and is received by the first communication device 11 based on the detected first and second arrival directions CD1 and CD2.

According to this configuration, the wireless device 200 can be guided to be located on the straight line L1 that extends in a propagation direction of the radio signal that is transmitted by the second communication device 12 and is received by the first communication device 11. According to this configuration, the wireless device 200 can be guided to such a position that the wireless device 200 can receive a radio signal that propagates through the same path as the propagation path of the radio signal that is transmitted by the second communication device 12 and is received by the first communication device 11. That is, the wireless device 200 can be guided to such a position that the wireless device 200 can receive a radio signal having sufficiently strong correlation with the radio signal that is transmitted by the second communication device 12 and is received by the first communication device 11.

Further, in the wireless device 200 according to the first embodiment, the first guide signal indicates a direction that is between the detected first and second arrival directions CD1 and CD2 and that is in a side where the angle formed by the first and second arrival directions CD1 and CD2 is smaller than 180°.

According to this configuration, the wireless device 200 can be guided so as to approach the straight line L1 that extends in a propagation direction of the radio signal that is transmitted by the second communication device 12 and is received by the first communication device 11.

In addition, in the wireless device 200 according to the first embodiment, the first guide signal indicates an intermediate direction between the first and second arrival directions CD1 and CD2.

According to this configuration, the wireless device 200 can be guided so as to more reliably approach the straight line L1 that extends in a propagation direction of the radio signal that is transmitted by the second communication device 12 and is received by the first communication device 11.

Further, the wireless device 200 according to the first embodiment generates the first guide signal indicating that an angle formed by the detected first and second arrival directions CD1 and CD2 is within a certain range including 180° when the angle is within the certain range.

According to this configuration, the wireless device 200 can recognize that the wireless device 200 has sufficiently approached the straight line L1 that extends in a propagation direction of the radio signal that is transmitted by the second communication device 12 and is received by the first communication device 11.

Further, the wireless device 200 according to the first embodiment generates the second guide signal for guiding the wireless device 200 to the first communication device 11 when the angle formed by the detected first and second arrival directions CD1 and CD2 is within a certain range including 180° when the angle is within the certain range.

According to this configuration, the wireless device 200 can approach the first communication device 11 along the straight line L1 when the wireless device 200 has sufficiently approached the straight line L1 that extends in a propagation direction of the radio signal that is transmitted by the second communication device 12 and is received by the first communication device 11.

Further, in the wireless device 200 according to the first embodiment, the second guide signal indicates the first arrival direction CD1.

According to this configuration, the wireless device 200 can reliably approach the first communication device 11.

Further, the wireless device 200 according to the first embodiment calculates the correlation parameter that indicates the strength of correlation between the radio signal that is transmitted by the second communication device 12 and is received by the first communication device 11 and the second radio signal that is transmitted by the second communication device 12 and is received by the wireless device 200. In addition, the wireless device 200 generates the second guide signal indicating that the calculated correlation parameter is equal to or larger than a certain threshold value.

According to this configuration, the wireless device 200 can recognize that the wireless device 200 is located at such a position that the wireless device 200 can receive a radio signal having sufficiently strong correlation with the radio signal that is transmitted by the second communication device 12 and is received by the first communication device 11.

Figure 11:
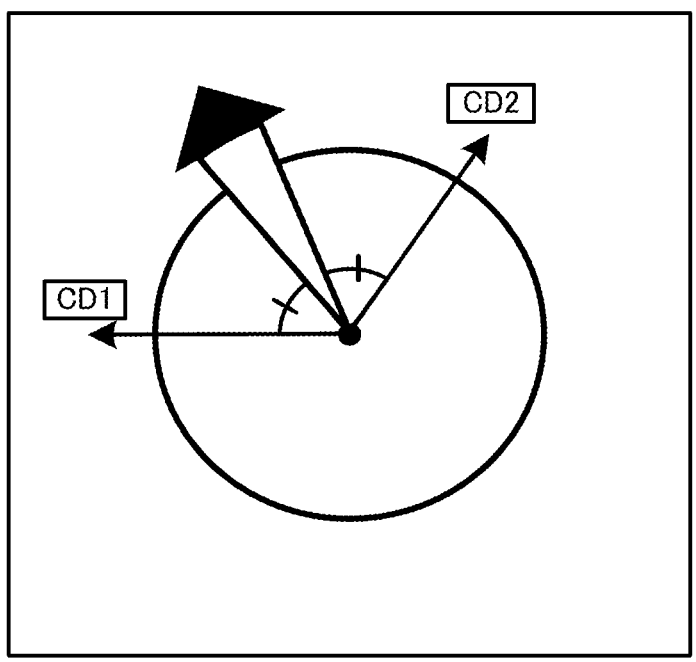
FIG. 11 is an explanatory diagram illustrating the first guiding direction displayed by a wireless device as a modification of the first embodiment.

Note that, although the wireless device 200 according to the first embodiment is configured to display only the first guiding direction GD1, as illustrated in FIG. 11, the wireless device 200 may be configured to display a certain range of rotation angles about the first guiding direction GD1.

Second Embodiment

Next, a wireless device according to a second embodiment of the present invention will be described. The wireless device according to the second embodiment is different from the wireless device according to the first embodiment, in that the first guiding direction is corrected after the first or second radio signal is not received. Hereinafter, the difference will be mainly described.

The guide signal generator 225 according to the second embodiment generates a first guide signal indicating that the first radio signal, the second radio signal or both thereof is not received when the first radio signal, the second radio signal or both thereof is not received.

Further, the guide signal generator 225 generates a signal before reception failure which is the first guide signal, corrects the first guiding direction when the second radio signal is received again after the second radio signal was not received, and generates the first guide signal indicating the corrected first guiding direction. For example, the guide signal generator 225 corrects the first guiding direction so as to be closer to the detected second arrival direction CD2 than the direction indicated by the signal before reception failure. That is, the guide signal generator 225 generates the first guide signal indicating a direction that is closer to the detected second arrival direction CD2 than the direction indicated by the signal before reception failure.

Similarly, the guide signal generator 225 generates the signal before reception failure which is the first guide signal, corrects the first guiding direction when the first radio signal is received again after the first radio signal was not received, and generates the first guide signal indicating the corrected first guiding direction. For example, the guide signal generator 225 corrects the first guiding direction so as to be closer to the detected first arrival direction CD1 than the direction indicated by the signal before reception failure. That is, the guide signal generator 225 generates the first guide signal indicating a direction that is closer to the detected first arrival direction CD1 than the direction indicated by the signal before reception failure.

(Operation)

Next, the operation of the wireless device 200 will be described. The operation will be described with reference to FIGS. 12 and 13.

Figure 12:
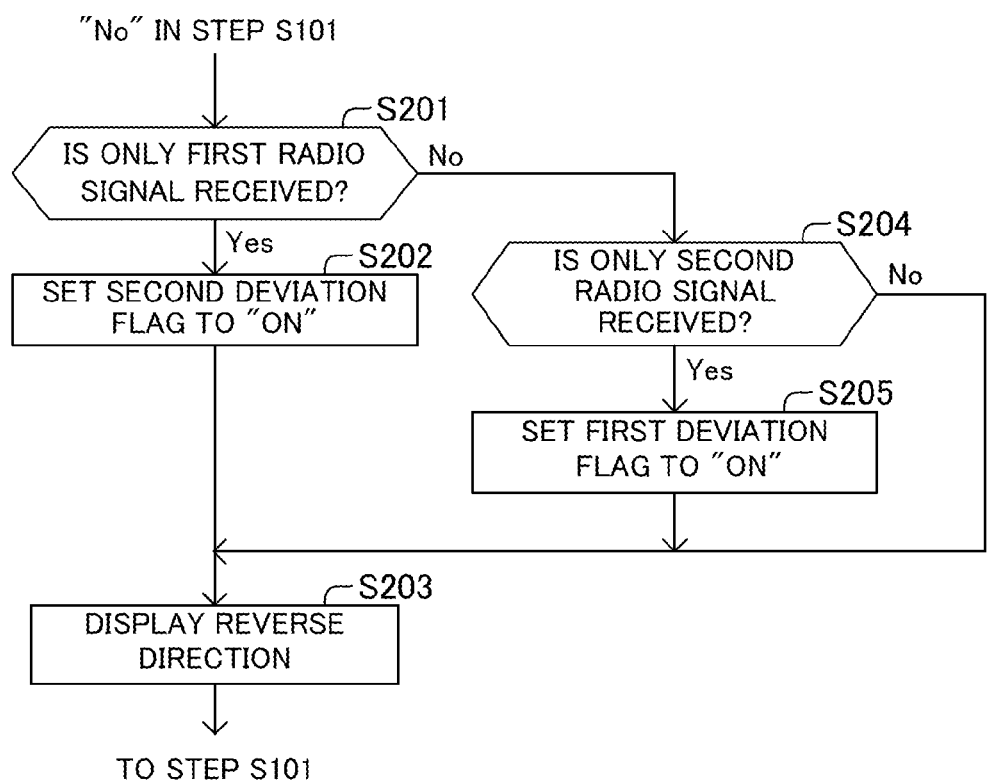
FIG. 12 is a flowchart illustrating part of a guiding process executed by a wireless device as an example of a second embodiment.
Figure 13:
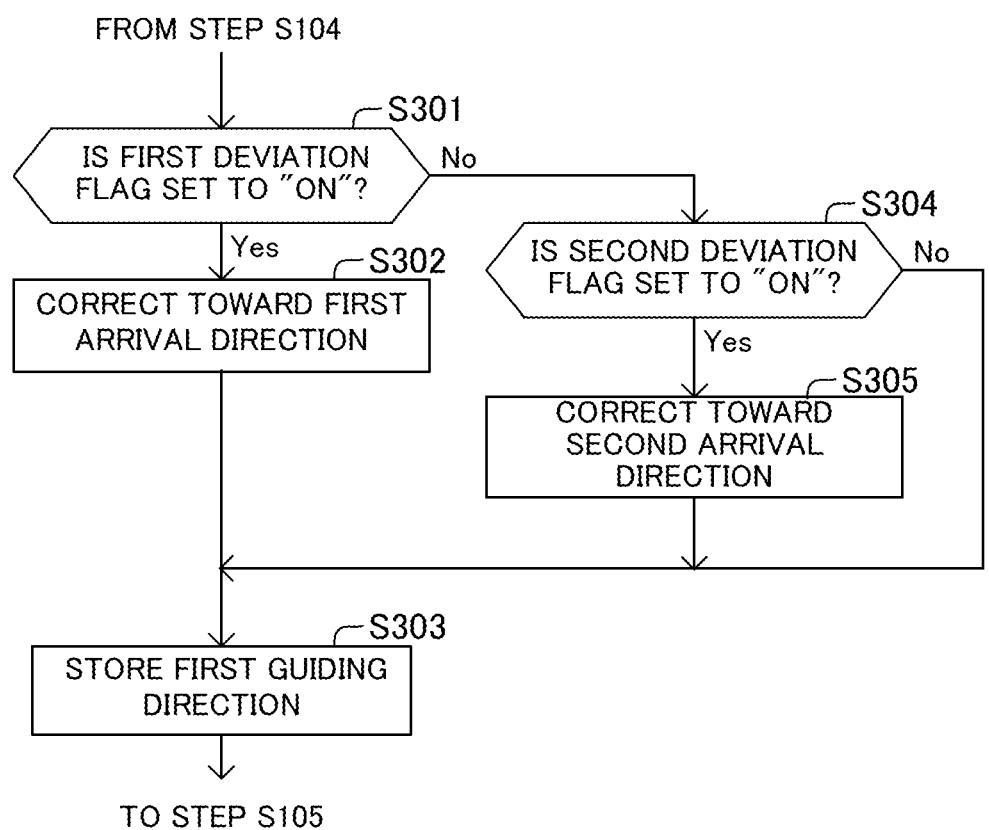
FIG. 13 is a flowchart illustrating part of a guiding process executed by the wireless device as an example of the second embodiment.

The wireless device 200 executes a process in which the process illustrated in FIG. 12 is added to the "No" route of step S101 of FIG. 5 and the process illustrated in FIG. 13 is added between steps S104 and S105 of FIG. 5 as the guiding process.

For example, when it is determined as "No" in step S101 of FIG. 5, the wireless device 200 determines whether the first radio signal only is received (step S201 of FIG. 12). Here, it is assumed that the wireless device 200 has received the first radio signal only (that is, the second radio signal is not received).

In this case, the wireless device 200 determines as "Yes" and sets a second deviation flag to "On" (step S202 of FIG. 12). The second deviation flag is information (flag) that can be set to "On" or "Off" and is held by the wireless device 200. As will be described later, when the second deviation flag is set to "On," the first guiding direction is corrected toward the second arrival direction CD2. Similarly, a first deviation flag described later is also information that can be set to "On" or "Off" and is held by the wireless device 200. When the first deviation flag is set to "On," the first guiding direction is corrected toward the first arrival direction CD1.

Subsequently, the wireless device 200 generates a first guide signal indicating a reverse direction. Here, the reverse direction is a direction opposite to the first guiding direction displayed in step S105 of FIG. 5. Note that the first guiding direction displayed previously is stored in step S303 of FIG. 13 as will be described later.

The wireless device 200 displays the reverse direction based on the generated first guide signal (step S203 of FIG. 12). Note that, in this example, the first guide signal indicating the reverse direction is an example of a signal indicating that the first radio signal, the second radio signal or both thereof is not received when the first radio signal, the second radio signal or both thereof is not received.

After that, the wireless device 200 returns to step S101 of FIG. 5.

In this manner, the user holding the wireless device 200 moves along the displayed reverse direction. As a result, the wireless device 200 moves away from the straight line L1. Moreover, the wireless device 200 receives the second radio signal again.

At this time, the wireless device 200 determines as "Yes" in step S101 of FIG. 5, executes the processes of steps S102 to S104, and determines the first guiding direction. Moreover, the wireless device 200 determines whether the first deviation flag is set to "On" (step S301 of FIG. 13).

At this time, the first deviation flag is set to "Off." Thus, the wireless device 200 determines as "No" and determines whether the second deviation flag is set to "On" (step S304 of FIG. 13). At this time, the second deviation flag is set to "On." Thus, the wireless device 200 determines as "Yes" and corrects the first guiding direction determined in step S104 of FIG. 5 so as to be closer to the second arrival direction detected in step S102 of FIG. 5 (step S305 of FIG. 13). In this example, the wireless device 200 corrects the first guiding direction by a certain correction amount (for example, 2°, 5°, or 10°).

That is, the corrected first guiding direction is a direction that is closer to the detected second arrival direction CD2 than the first guiding direction indicated by the signal before reception failure which is the first guide signal generated when the second radio signal is received. In this manner, the wireless device 200 can be guided to the direction that is closer to the second arrival direction CD2 than the direction indicated by the signal before reception failure. As a result, the possibility that the wireless device 200 is not capable of receiving the second radio signal can be reduced.

After that, the wireless device 200 stores the corrected first guiding direction (step S303 of FIG. 13). Moreover, the wireless device 200 proceeds to step S105 of FIG. 5.

Next, it is assumed that the wireless device 200 receives the second radio signal only (that is, the first radio signal is not received).

In this case, the wireless device 200 determines as "No" in step S101 of FIG. 5, determines as "No" in step S201 of FIG. 12, and determines whether only the second radio signal is received (step S204 of FIG. 12). According to this assumption, the wireless device 200 determines as "Yes" and sets the first deviation flag to "On" (step S205 of FIG. 12).

Subsequently, the wireless device 200 generates the first guide signal indicating a reverse direction. Here, the reverse direction is a direction that is opposite to the first guiding direction displayed previously in step S105 of FIG. 5. The wireless device 200 displays the reverse direction based on the generated first guide signal (step S203 of FIG. 12). After that, the wireless device 200 returns to step S101 of FIG. 5.

In this manner, the user holding the wireless device 200 moves along the displayed reverse direction. As a result, the wireless device 200 moves away from the straight line L1. Moreover, the wireless device 200 receives the first radio signal again.

At this time, the wireless device 200 determines as "Yes" in step S101 of FIG. 5, executes the processes of steps S102 to S104, and determines the first guiding direction. Moreover, the wireless device 200 determines whether the first deviation flag is set to "On" (step S301 of FIG. 13).

At this time, the first deviation flag is set to "On." Thus, the wireless device 200 determines as "Yes" and corrects the first guiding direction determined in step S104 of FIG. 5 so as to be closer to the first arrival direction detected in step S102 of FIG. 5 (step S302 of FIG. 13). In this example, the wireless device 200 corrects the first guiding direction by the correction amount.

That is, the corrected first guiding direction is a direction that is closer to the detected first arrival direction CD1 than the first guiding direction indicated by the signal before reception failure which is the first guide signal generated when the first radio signal is received. In this manner, the wireless device 200 can be guided to the direction that is closer to the first arrival direction CD1 than the direction indicated by the signal before reception failure. As a result, the possibility that the wireless device 200 is not capable of receiving the first radio signal can be reduced.

After that, the wireless device 200 stores the corrected first guiding direction (step S303 of FIG. 13). Moreover, the wireless device 200 proceeds to step S105 of FIG. 5.

Note that, when both the first and second deviation flags are set to "Off" at the point in time when the process of step S104 of FIG. 5 is executed, the wireless device 200 determines as "No" in steps S301 and S304 of FIG. 13. Moreover, the wireless device 200 executes the process of step S303 without executing the processes of steps S302 and S305 and proceeds to step S105 of FIG. 5.

As described above, the wireless device 200 according to the second embodiment generates the first guide signal indicating that the first radio signal, the second radio signal or both thereof is not received when the first radio signal, the second radio signal or both thereof is not received.

According to this configuration, the wireless device 200 can recognize that the first radio signal, the second radio signal or both thereof is not received when the first radio signal, the second radio signal or both thereof is not received before the wireless device 200 sufficiently approaches the straight line L1 that extends in a propagation direction of the radio signal that is transmitted by the second communication device 12 and is received by the first communication device 11.

Further, the wireless device 200 according to the second embodiment generates the signal before reception failure which is the first guide signal and generates the first guide signal indicating the direction that is closer to the detected second arrival direction CD2 than the direction indicated by the signal before reception failure when the second radio signal is received again after the second radio signal was not received.

According to this configuration, the wireless device 200 returns in a direction opposite to the moving direction when the wireless device 200 could not receive the second radio signal before the wireless device 200 sufficiently approaches the straight line L1. In this case, the wireless device 200 receives the second radio signal again.

In this case, the wireless device 200 generates the first guide signal indicating a direction that is closer to the second arrival direction CD2 than the direction indicated by the signal before reception failure generated before the second radio signal was not received. In this manner, the wireless device 200 can be guided to the direction that is closer to the second arrival direction CD2 than the direction indicated by the signal before reception failure. As a result, the possibility that the wireless device 200 is not capable of receiving the second radio signal can be reduced.

Further, the wireless device 200 according to the second embodiment generates the signal before reception failure which is the first guide signal and generates the first guide signal indicating the direction that is closer to the detected first arrival direction CD1 than the direction indicated by the signal before reception failure when the first radio signal is received again after the first radio signal was not received.

According to this configuration, the wireless device 200 returns in a direction opposite to the moving direction when the wireless device 200 could not receive the first radio signal before the wireless device 200 sufficiently approaches the straight line L1. In this case, the wireless device 200 receives the first radio signal again.

In this case, the wireless device 200 generates the first guide signal indicating a direction that is closer to the first arrival direction CD1 than the direction indicated by the signal before reception failure generated before the first radio signal was not received. In this manner, the wireless device 200 can be guided to the direction that is closer to the first arrival direction CD1 than the direction indicated by the signal before reception failure. As a result, the possibility that the wireless device 200 is not capable of receiving the first radio signal can be reduced.

The present invention has been described with reference to the embodiments, the present invention is not limited to the above embodiments. Various changes that can be conceived by those skilled in the art within the scope of the present invention can be made to the configuration and details of the present invention.

Note that the wireless device 200 may be configured to move by itself. In this case, it is preferable that the wireless device 200 be configured to generate a control signal for controlling its movement as the guide signal.

Note that the respective functions of the wireless device in the respective embodiments are realized by hardware such as a circuit. However, the wireless device may include a computer that includes a processing device and a storage device that stores programs (software) and may be configured such that the respective functions are realized by the processing device executing the programs. In this case, the programs may be stored in a computer readable recording medium. For example, the recording medium is a portable medium such as a flexible disk, an optical disc, a magneto-optical disc, or a semiconductor memory.

In addition, an optional combination of the above embodiments and modifications may be employed as another modification of the embodiments within the range without departing from the spirit of the present invention.

According to a wireless device of the present disclosure, it is possible to guide the wireless device to such a position that the wireless device can receive a radio signal having correlation with a radio signal that is received by a target communication device.

All examples and conditional language provided herein are intended for pedagogical purposes of aiding the reader in understanding the invention and the concepts contributed by the inventor to furthering the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless device comprising:
a receiver that receives a first radio signal transmitted from a first communication device and a second radio signal transmitted from a second communication device; and
a processor that detects a first arrival direction which is a direction opposite to a propagation direction of the received first radio signal and a second arrival direction which is a direction opposite to a propagation direction of the received second radio signal and generates a first signal for guiding the wireless device so as to be located on a straight line that extends in a propagation direction of the second radio signal received by the first communication device based on the detected first and second arrival directions, wherein the first signal indicates an intermediate direction between the first and second arrival directions in a side where an angle formed by the first and second arrival directions is smaller than 180°, the intermediate direction bisecting the angle.

2. The wireless device according to claim 1, wherein
the processor is configured to generate the first signal indicating that an angle formed by the detected first and second arrival directions is within a certain range including 180° when the angle is within the certain range.

3. The wireless device according to claim 2, wherein
the processor is configured to generate the first signal indicating that the angle formed by the detected first and second arrival directions is 180° when the angle is 180°.

4. The wireless device according to claim 1, wherein
the processor is configured to generate a second signal for making the wireless device to approach the first communication device when an angle formed by the detected first and second arrival directions is within a certain range including 180°.

5. The wireless device according to claim 4, wherein
the second signal indicates the first arrival direction.

6. The wireless device according to claim 4, wherein,
the processor is configured to calculate a parameter indicating strength of correlation between the second radio signal received by the first communication device and the second radio signal received by the wireless device and to generate the second signal indicating that the calculated parameter is equal to or larger than a certain threshold value.

7. The wireless device according to claim 1, wherein
the processor is configured to generate the first signal indicating that the first radio signal, the second radio signal or both thereof is not received when the first radio signal, the second radio signal or both thereof is not received.

8. The wireless device according to claim 7, wherein
the first signal indicates a direction that is between the detected first and second arrival directions and that is in a side where an angle formed by the first and second arrival directions is smaller than 180°, and
the processor is configured to generate a signal before reception failure which is the first signal and then to generate the first signal indicating a direction that is closer to the detected second arrival direction than a direction indicated by the signal before reception failure when the second radio signal is received again after the second radio signal was not received.

9. The wireless device according to claim 7, wherein the first signal indicates a direction that is between the detected first and second arrival directions and that is in a side where an angle formed by the first and second arrival directions is smaller than 180°, and the processor is configured to generate a signal before reception failure which is the first signal and then to generate the first signal indicating a direction that is closer to the detected first arrival direction than a direction indicated by the signal before reception failure when the first radio signal is received again after the first radio signal was not received.

10. A control method for controlling a wireless device, comprising:

receiving, by the wireless device, a first radio signal transmitted by a first communication device and a second radio signal transmitted by a second communication device;

detecting, by the wireless device, a first arrival direction which is a direction opposite to a propagation direction of the received first radio signal and a second arrival direction which is a direction opposite to a propagation direction of the received second radio signal; and generating, by the wireless device, a first signal for guiding the wireless device so as to be located on a straight line that extends in a propagation direction of the second radio signal received by the first communication device based on the detected first and second arrival directions, wherein the first signal indicates an intermediate direction between the first and second arrival directions in a side where an angle formed by the first and second arrival directions is smaller than 180° the intermediate direction bisecting the angle.

11. The control method according to claim 10, further comprising:

generating, by the wireless device, the first signal indicating that an angle formed by the detected first and second arrival directions is within a certain range including 180° when the angle is within the certain range.

12. A non-transitory computer readable recording medium having stored therein a program for causing a computer to execute a process for controlling a wireless device, the process comprising:

receiving a first radio signal transmitted by a first communication device and a second radio signal transmitted by a second communication device;

detecting a first arrival direction which is a direction opposite to a propagation direction of the received first radio signal and a second arrival direction which is a direction opposite to a propagation direction of the received second radio signal; and generating a first signal for guiding the wireless device so as to be located on a straight line that extends in a propagation direction of the second radio signal received by the first communication device based on the detected first and second arrival directions, wherein the first signal indicates an intermediate direction between the first and second arrival directions in a side where an angle formed by the first and second arrival directions is smaller than 180°, the intermediate direction bisecting the angle.

13. The recording medium according to claim 12, wherein the process further comprises:

generating the first signal indicating that an angle formed by the detected first and second arrival directions is within a certain range including 180° when the angle is within the certain range.

14. A display method of displaying information for guiding a wireless device, comprising:

displaying information for guiding the wireless device so as to be located on a straight line that extends in a propagation direction of a radio signal that is transmitted by a second communication device and is received by a first communication device based on a first arrival direction that is opposite to a propagation direction of a radio signal that is transmitted by the first communication device and is received by the wireless device and a second arrival direction that is opposite to a propagation direction of a radio signal that is transmitted by the second communication device and is received by the wireless device, wherein the information indicates an intermediate direction between the first and second arrival directions in a side where an angle formed by the first and second arrival directions is smaller than 180°, the intermediate direction bisecting the angle.

* * * * *